United States Patent [19]

Warren

[11] Patent Number: 4,623,049
[45] Date of Patent: Nov. 18, 1986

[54] DUAL MODE SHOCK ABSORBER AND METHOD

[75] Inventor: Steven M. Warren, Seattle, Wash.

[73] Assignee: The Boeing Company, Seattle, Wash.

[21] Appl. No.: 761,515

[22] Filed: Aug. 1, 1985

[51] Int. Cl.⁴ .............................. F16F 9/48; F16F 9/50
[52] U.S. Cl. .................................... 188/281; 188/287; 188/314; 188/322.14
[58] Field of Search .............. 188/280, 281, 283, 284, 188/285, 286, 287, 300, 314, 322.14, 282; 244/104 FP

[56] References Cited

U.S. PATENT DOCUMENTS

| | | | |
|---|---|---|---|
| 2,332,161 | 10/1943 | McIntyre et al. | 188/287 |
| 2,426,585 | 9/1947 | Bean et al. | 188/287 X |
| 2,655,232 | 10/1953 | Etherton | 188/287 |
| 2,958,400 | 11/1960 | Gilbert | 188/287 |
| 3,207,270 | 9/1965 | Ellis, Jr. | 188/287 |
| 3,344,894 | 10/1967 | Kenworthy | 188/287 |
| 3,419,114 | 12/1968 | Rumsey | 188/287 |
| 3,446,317 | 5/1969 | Gryglas | 188/287 |
| 3,478,846 | 11/1969 | Germond | 188/287 X |
| 3,510,117 | 5/1970 | Scholin et al. | 188/287 X |
| 3,531,065 | 9/1970 | Brown | 188/287 X |
| 3,598,206 | 8/1971 | Hennells | 188/287 |
| 3,605,960 | 9/1971 | Singer | 188/287 |
| 3,693,767 | 9/1972 | Johnson | 188/285 |
| 3,750,856 | 8/1973 | Kenworthy | 188/287 |
| 3,998,302 | 12/1976 | Schupner | 188/285 |
| 4,057,129 | 11/1977 | Hennells | 188/285 |
| 4,076,225 | 2/1978 | Houghton | 188/285 X |
| 4,558,837 | 12/1985 | Mens et al. | 244/104 FP X |

Primary Examiner—Bruce H. Stoner, Jr.
Assistant Examiner—Richard R. Diefendorf
Attorney, Agent, or Firm—Joan H. Pauly

[57] ABSTRACT

Tubular members (22, 24) define a pressure chamber (26) and a reserve chamber (28) between them. A first variable metered hydraulic orifice area is provided between chambers (26, 28) by openings (32) in a metering tube (30). A second metered hydraulic orifice area is provided by fixed orifice (94). In a first mode of operation, both such areas are open during an initial retraction of members (22, 24). Control tube (34) is coaxial with metering tube (30) and has openings (36). In the first mode, latch (62) locks tubes (30, 34) together with openings (32, 36) aligned. Relative extension of members (22, 24) following the initial retraction causes pressure in chamber (28) to rise above pressure in chamber (26) and latch (62) to release control tube (34). Spring (40) moves tube (34) into a closed position in which it blocks openings (32). Shock absorber (20) then operates in its second mode in which fixed orifice (94) remains open and openings (32) remain closed. Relief valve (96) relieves excessive pressure buildup in chamber (26) in the second mode. Subsequent full extension of members (22, 24) automatically resets shock absorber (20) for operation in its first mode.

17 Claims, 15 Drawing Figures

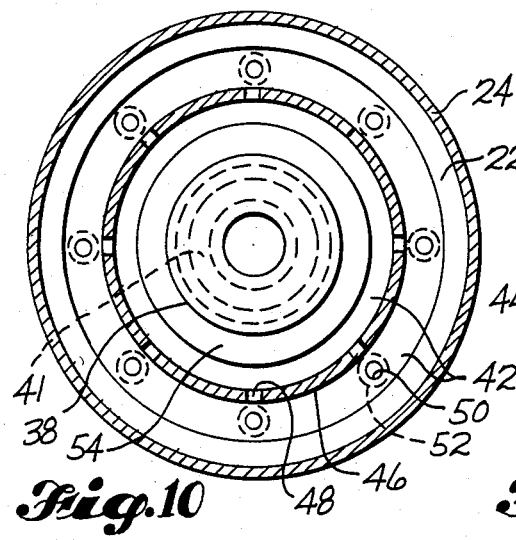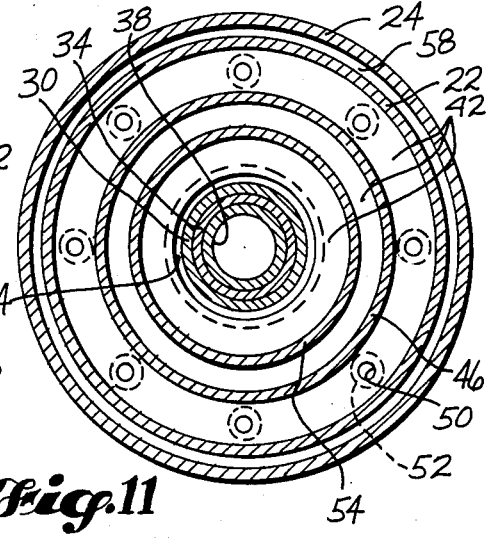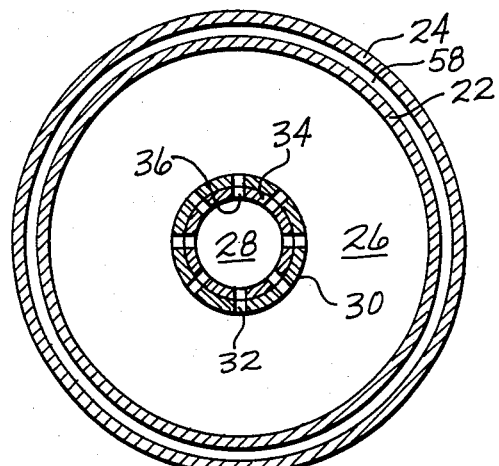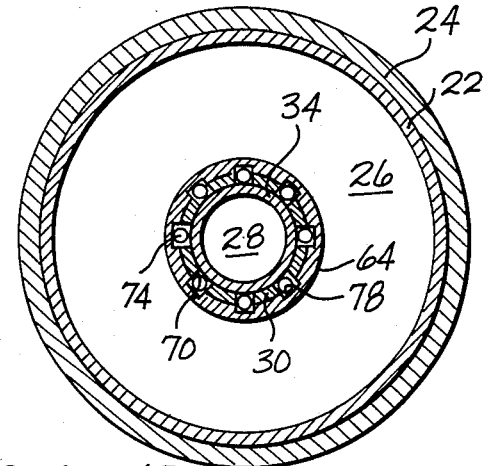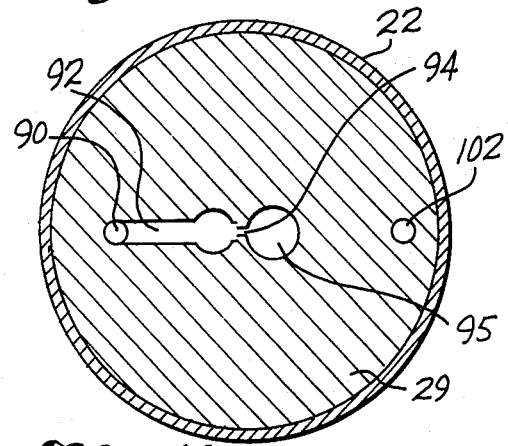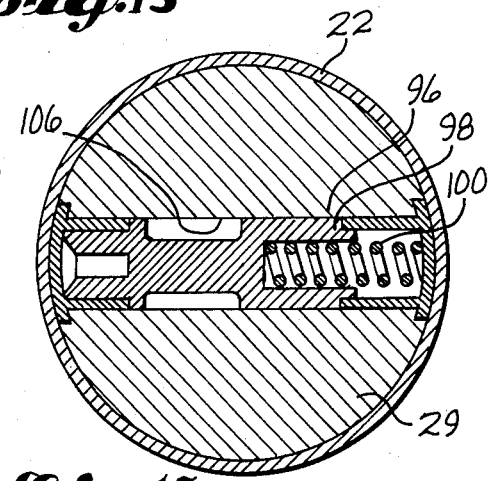

ABSORBER AND METHOD

TECHNICAL FIELD

This invention relates to shock absorbers and, more particularly, to a shock absorber having a first mode of operation with a relatively large hydraulic orifice area that decreases during an initial compression, and a second mode of operation with a relatively small fixed orifice area for dampening loads caused by relative extensions and compressions following the initial compression.

BACKGROUND ART

In recent years, it has been demonstrated that one of the most effective means of disabling a military adversary's air strike capability is to destroy the runways from which the adversary's aircraft must operate. This has led to the development of munitions having a sole purpose of inflicting damage to runways. Damage to runways inflicted by such special purpose munitions and other types of munitions varies from cratering caused by direct hits by pavement-penetration bombs, to surface pitting and spalls caused by aircraft cannon fire.

It is, of course, highly desirable to repair a damaged runway as quickly as possible in order to permit its use. At the present time, the most expedient means of repairing a damaged runway is considered to be filling and covering bomb craters and clearing debris from the runway without attempting repair of surface pitting and spalls. Covering a bomb crater in a reasonably short period of time and achieving a perfectly flat surface at the repair site is not possible. Therefore, expediently repaired runways include both surface pitting and spalls, and nonflat crater repair sites. If such a runway is to be usable by military aircraft, the aircraft must be provided with load isolation capability sufficient to enable the aircraft to land on the runway and taxi over surface damage and crater repair sites. Conventional shock absorbers associated with the landing gear on military aircraft do not have sufficient load isolation capability to protect the aircraft structure from excessive rough field taxi loads and to control the pitch and heave motion of the aircraft during ground roll over an expediently repaired runway.

It is anticipated that future military aircraft will be required to land at vertical velocities, or sink rates, significantly higher than the landing sink rates of current military aircraft. Higher sink rates will in turn create a need for more efficient absorbtion of touchdown energy in order to protect an aircraft from loads exceeding its structural limits. Thus, future shock absorbers for the landing gear of military aircraft will be required to more efficiently absorb touchdown energy.

The requirements for future military aircraft discussed above, the need for controlling rough field taxi loads and aircraft motion during ground roll and the need for more efficient absorbtion of touchdown energy, are, in combination, incompatible with conventional landing gear designs and cannot be achieved with such designs. Although conventional landing gear generally absorbs touchdown energy with reasonable efficiency, conventional landing gear does not provide the load isolation capability and control of aircraft motion necessary for ground roll operations over rough surfaces. Modification of conventional landing gear to improve ground roll operation cannot be achieved using conventional design approaches without adversely affecting landing performance. Therefore, there is a need for an entirely new design approach.

A shock absorber is disclosed in each of U.S. Pat. No. 2,332,161, granted Oct. 19, 1943, to B. D. McIntyre et al; U.S. Pat. No. 2,426,585, granted Sept. 2, 1947, to H. S. Bean et al; U.S. Pat. No. 2,655,232, granted Oct. 13, 1953, to M. D. Etherton; U.S. Pat. No. 2,958,400, granted Nov. 1, 1960, to E. D. Gilbert; U.S. Pat. No. 3,207,270, granted Sept. 21, 1965, to J. T. Ellis, Jr.; U.S. Pat. No. 3,344,894, granted Oct. 3, 1967, to G. F. Kenworthy; U.S. Pat. No. 3,419,114, granted Dec. 31, 1968, to R. D. Rumsey; U.S. Pat. No. 3,446,317, granted May 27, 1969, to B. Gryglas; U.S. Pat. No. 3,478,846, granted Nov. 18, 1969, to H. S. Germond IV; U.S. Pat. No. 3,510,117, granted May 5, 1970, to H. W. Scholin et al; U.S. Pat. No. 3,598,206, granted Aug. 10, 1971, to R. J. Hennells; U.S. Pat. No. 3,605,960, granted Sept. 20, 1971, to J. R. Singer; U.S. Pat. No. 3,693,767, granted Sept. 26, 1972, to K. B. Johnson; U.S. Pat. No. 3,750,856, granted Aug. 7, 1973, to G. F. Kenworthy; U.S. Pat. No. 3,998,302, granted Dec. 21, 1976, to W. J. Schupner; and U.S. Pat. No. 4,057,129, granted Nov. 8, 1977, to R. J. Hennells. The shock absorbers disclosed by Bean et al, Etherton, and Gilbert are specifically intended for use in aircraft landing gear. U.S. Pat. No. 3,531,065, granted Sept. 29, 1970, to R. J. Brown discloses an aircraft arresting device for use on aircraft carriers, which device has a hook arm controlled by a telescopic jack and damper unit.

In the shock absorbers disclosed by Ellis, Jr., Kenworthy (both patents), Rumsey, Gryglas, Germond IV, Scholin et al, Hennells (both patents), Singer, Johnson, and Schupner, axially spaced openings in a metering tube or cylinder are progressively closed off by a piston element as the shock absorber compresses to provide increasing resistance to the compressive movement. The shock absorbers disclosed by Scholin et al, Johnson, and Schupner each include a metering sleeve that is coaxial with the cylinder and manually movable in an axial direction to adjust the effective size of the openings in the cylinder. The shock absorbers disclosed in the 1967 Kenworthy patent, the Germond IV patent, and the 1971 Hennells patent also have coaxial metering sleeves for adjusting the effective size of the openings in the cylinder, but the manual adjustment is accomplished by rotating the sleeve. Ellis, Jr., and Gryglas disclose other means for manually adjusting the effective size of the openings in the metering tube. The Rumsey shock absorber is provided with an adjustment screw for adjusting a valve to in turn adjust the stiffness of the shock absorber. In operation, the valve automatically maintains a fixed pressure differential across the metered orifice area.

The Singer patent, the 1973 Kenworthy patent, and the 1977 Hennells patent each disclose a sleeve that is coaxial with the metering tube and slides axially with respect to such tube to automatically adjust the effective area of the openings in the tube. In each of the three devices, the metering sleeve is spring-biased and moves in response in changes in pressure. In the Singer and Kenworthy shock absorbers, higher pressure during the compression stroke causes the sleeve to move to automatically throttle the openings to in turn provide greater resistance to compressive movement; in the Hennells shock absorber, higher pressure during the compression stroke causes the sleeve to be axially displaced to automatically increase the hydraulic flow path cross section.

The shock absorber disclosed by McIntyre et al includes a cylinder with a plurality of axially spaced sets of orifices that are controlled by valves of differing resistance. When either compression or extension movement of a piston within the cylinder is greater than normal, a set of openings is closed so that hydraulic fluid must flow through valves with greater resistance. This automatically provides greater resistance to movement that is greater than normal. In the Etherton shock absorber, a hollow metering pin carried by one tubular member slides through a radial sealing wall carried by another tubular member, and the rate of flow of hydraulic fluid is controlled by apertures in the pin passing the sealing wall. During compression, there is at first high resistance, then the resistance decreases quickly, and then the resistance again gradually increases. In the Gilbert shock absorber, the changing diameter of a metering pin moving past a diaphragm provides changing resistance similar to that in the Etherton shock absorber. The contraction of the shock absorber compresses air in the shock absorber to provide a resilient cushion of compressed air which supports the aircraft and absorbs part of the jarring and bumping of the aircraft during taxiing.

The above patents and the prior art that is discussed and/or cited therein should be studied for the purpose of putting the present invention into proper perspective relative to the prior art.

DISCLOSURE OF THE INVENTION

A subject of the invention is a dual mode shock absorber. According to an aspect of the invention, the shock absorber comprises first and second generally tubular members positioned telescopically with respect to each other. These members define a pressure chamber and a reserve chamber between them. First and second passageway means provide first and second metered hydraulic orifice areas, respectively, between the chambers. The shock absorber has closure means for closing the first orifice area. The closure means has an open position in which it allows flow of hydraulic fluid through the first orifice area, and a closed position in which it blocks such flow. Releasable latch means locks the closure means in its open position. The latch means is automatically releasable, to allow the closure means to move into its closed position, in response to higher pressure in the reserve chamber than in the pressure chamber caused by extension of the tubular members relative to each other. The shock absorber has a first mode of operation in which both the first and second orifice areas are open during an initial retraction of the tubular members relative to each other, and a second mode of operation in which the first orifice area is closed by the closure means and the second orifice area is open.

A feature of the invention is the provision of reset means for moving the closure means and for causing the releasable latch means to lock. The reset means automatically moves the closure means from its closed position to its open position when the tubular members move into fully extended positions relative to each other. The releasable latch means automatically locks the closure means in such open position until the latch means is automatically released in response to higher pressure in the reserve chamber than in the pressure chamber. Shock absorbers of the invention that include this feature operate entirely automatically. When the aircraft takes off, gravity causes the tubular members to fully extend to reset the closure means into its first mode open position. This resetting on takeoff ensures that the shock absorbers will be ready to absorb touchdown energy whenever the aircraft lands.

According to a preferred aspect of the invention, the first passageway means comprises a plurality of axially spaced openings in a metering tube carried by one of the tubular members. The closure means comprises a control tube that is coaxial with and axially slidable with respect to the metering tube and that has a plurality of axially spaced openings. The latch means includes portions that lock the metering tube and the control tube together with the openings in the control tube aligned with the openings in the metering tube when the closure means is in its open position. The closure means further comprises biasing means for biasing the control tube toward a position in which the openings in the control tube are out of alignment with the openings in the metering tube and portions of the control tube block the openings in the metering tube.

In the preferred embodiment, the latch means includes an annular slide member that is coaxial with the metering tube and the control tube and that is axially slidable between a lock position in which it locks the metering tube and the control tube together with the openings in the control tube aligned with the openings in the metering tube, and a release position in which the control tube is free to slide axially relative to the metering tube. The slide member has a radial surface which is in communication with the reserve chamber and receives an axially directed force from said higher pressure to move the slide member from its lock position to its release position. This arrangement has the advantages of being relatively simple in construction and highly reliable in operation.

According to another preferred aspect of the invention, the slide member further includes radial surface portions that are in communication with pressure in the pressure chamber, and the latch means further includes resilient means for biasing the slide member toward its lock position. The radial surface portions receive from pressure in the pressure chamber an axially directed force tending to move the slide member toward its lock position. The radial surface portions are dimensioned and the resilient means is sufficiently stiff to prevent the slide member from moving into its release position until the pressure in the reserve chamber exceeds the pressure in the pressure chamber by a predetermined amount. This combination of features helps to prevent premature movement of the slide member and release of the closure means to in turn prevent premature shifting of the operation of the shock absorber from its first mode to its second mode of operation.

The preferred embodiment of the latch means includes a plurality of radially directed recesses in the control tube and a plurality of balls positioned in radial holes through the metering tube. The slide member urges the balls into the recesses to lock the metering tube and control tube together when the slide member is in its lock position. This construction and operation of the latch means has the advantages of being very reliable but relatively inexpensive to manufacture and maintain.

The shock absorber preferably further comprises an annular seal plate carried by one of the tubular members and axially slidable with respect to the metering tube and the control tube. The seal plate sealingly engages the outer circumferential surface of the outermost of the metering tube and the control tube. In the preferred embodiment, the pressure chamber is defined by an annular radial surface of the seal plate, a portion of the outer surface of the outermost of the metering tube and the control tube, and portions of the tubular member which carries the metering tube. The reserve chamber is defined by an inner, generally cylindrical surface of the innermost of the metering tube and the control tube, an annular radial surface of the seal plate opposite the radial surface which partially defines the pressure chamber, and portions of the tubular member which carries the seal plate. This preferred configuration of the shock absorber maximizes the efficient use of space so that the shock absorber can be dimensioned within space limitations without sacrificing its performance characteristics.

According to a preferred aspect of the invention, the shock absorber further comprises an annular seal plate and reset means. The seal plate is carried by one of the tubular members and is axially slidable with respect to the metering tube and the control tube. The seal plate sealingly engages the outer circumferential surface of the outermost of the metering tube and control tube. The reset means moves the closure means from its closed position to its open position when the tubular members move into fully extended positions relative to each other, and causes the latch means to lock the closure means in its open position until the latch means is automatically released in response to higher pressure in the reserve chamber than in the pressure chamber. The reset means includes biasing means for moving the latch means into a lock position in which it locks the closure means in its open position when the closure means moves into such open position, a projection carried by the seal plate, and a reset catch carried by the control tube. The projection on the seal plate and the reset catch are positioned to cause the projection to engage the catch as the tubular members approach their fully extended positions.

The above-described combination of a seal plate and reset means provides relatively simple and inexpensive structure for automatically resetting the shock absorber for operation in its first mode when the tubular members fully extend with respect to each other. Thus, when the shock absorber is installed in an aircraft, there is no need for any human intervention in order to shift the modes of operation of the shock absorber. When the aircraft takes off, the tubular members automatically fully extend with respect to each other to set the sock absorber to operate in its first mode of operation when the aircraft lands. Following the landing, the shock absorber remains in its first mode of operation until the tubular members partially extend with respect to each other during ground roll of the aircraft over the runway. The shock absorber remains in its second mode of operation until the aircraft again takes off.

A preferred feature of the invention is the provision of third passageway means between the pressure chamber and the reserve chamber and a relief valve that normally closes the third passageway means. When the shock absorber is in its second mode of operation, the relief valve opens in response to a compressive load on the tubular members exceeding a predetermined amount to permit flow of hydraulic fluid through the third passageway means from the pressure chamber into the reserve chamber. When the shock absorber is installed in the landing gear of an aircraft, this feature isolates and protects the aircraft structure from excessive loads during taxiing on damaged or semi-prepared runways. In the preferred embodiment, the shock absorber also includes sensing passageway means communicating the reserve chamber with one end of the relief valve. The sensing passageway means is blocked by the control tube when the closure means is in its open position and is open when the closure means is in its closed position. This arrangement allows the relief valve to open when the shock absorber is in its second mode of operation but not when the shock absorber is in its first mode of operation.

Another subject of the invention is a dual mode method for absorbing shocks. According to an aspect of the invention, the method comprises providing two tubular members positioned telescopically with respect to each other and defining a pressure chamber and a reserve chamber therebetween, providing first and second metered hydraulic orifice areas between the chambers, and providing closure means for closing the first orifice area. The tubular members are fully extended with respect to each other, and the closure means is releasably locked into an open position in which it allows flow of hydraulic fluid through the first orifice area. A compressive force is applied to the tubular members to cause them to retract relative to each other, and hydraulic fluid is allowed to flow through both the first and second orifice areas to absorb the energy of the compressive force. When such energy has been absorbed, the members are allowed to partially extend relative to each other. A pressure differential between the chambers caused by the relative extension of the members is allowed to release the closure means and in turn allow the closure means to move into a closed position in which it blocks the first orifice area. While maintaining the closure means in its closed position, relative extensions and retractions of the tubular members with respect to each other are allowed to be dampened by flow of hydraulic fluid through the second orifice area. Preferably, a subsequent full extension of the tubular members relative to each other automatically moves the closure means back into its open position, and the closure means is again releasably locked in its open position.

According to a preferred aspect of the method of the invention, providing the first orifice area comprises providing a plurality of axially spaced openings in a metering tube carried by one of the tubular members, and providing the closure means comprises providing a control tube. The control tube is coaxial with and axially slidable with respect to the metering tube and has a plurality of axially spaced openings that are aligned with the openings in the metering tube when the closure means is in its open position. Portions of the control tube block the openings in the metering tube when the closure means is in its closed position. Releasably locking the closure means into its open position includes releasably locking the metering tube and the control tube together.

In the preferred embodiment of the method of the invention, a relief valve is provided between the two chambers. This valve is maintained in a closed position when the closure means is in its open position. The valve is allowed to open to communicate the chambers with each other when the closure means is in its closed position and a compressive load on the members exceeds a predetermined limit.

The method and apparatus of the invention provide a new design approach for shock absorbers which is particularly well-suited to the anticipated future requirements for military aircraft. The provision of two separate modes of operation makes it possible to accomplish optimal absorption of landing impact energy and also to optimize the control of rough field taxi loads and aircraft motion during ground roll over damaged or semi-prepared runways. The optimization of performance in each mode of operation is achieved without sacrificing performance in the other mode of operation. In addition, the shock absorbing system of the invention is highly reliable and automatically switches from a landing mode to a ground roll mode without any need for human intervention. Following the initial compression stroke during landing, a relative extension of the tubular members of the landing gear with respect to each other automatically causes the shock absorbing system to switch from its first mode to its second mode of operation. The shock absorber of the invention is relatively simple in structure and, thus, is relatively inexpensive to manufacture and easy and inexpensive to maintain.

These and other advantages and features will become apparent from the detailed description of the best mode for carrying out the invention that follows.

BRIEF DESCRIPTION OF THE DRAWINGS

In the drawings, like element designations refer to like parts throughout, and:

FIGS. 10, 11, and 12 are sectional views taken along the lines 10—10, 11—11, and 12—12, respectively, in FIG. 7.

FIGS. 13, 14, and 15 are sectional views taken along the lines 13—13, 14—14, and 15—15, respectively, in FIG. 8

BEST MODE FOR CARRYING OUT THE INVENTION

Figure 1:
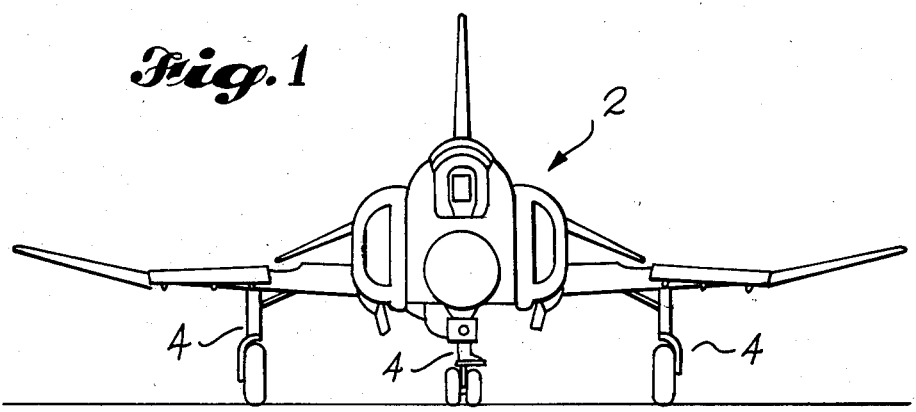
FIG. 1 is a front elevational view of a type of military aircraft into which the shock absorber of the invention may be incorporated.
Figure 2:
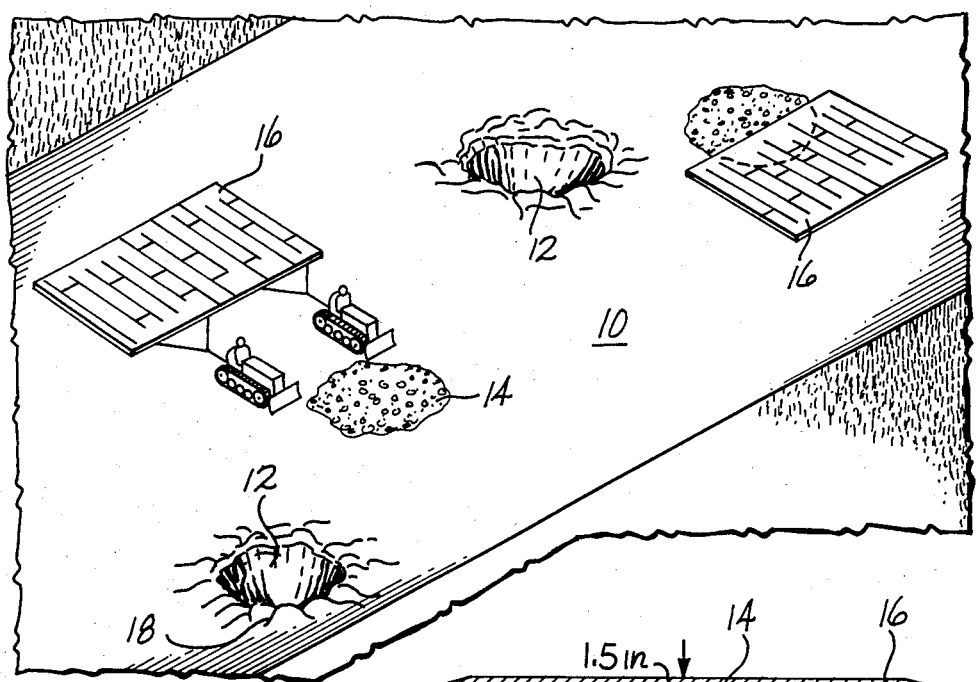
FIG. 2 is a pictorial view of a bomb-damaged runway undergoing repair.
Figure 3:
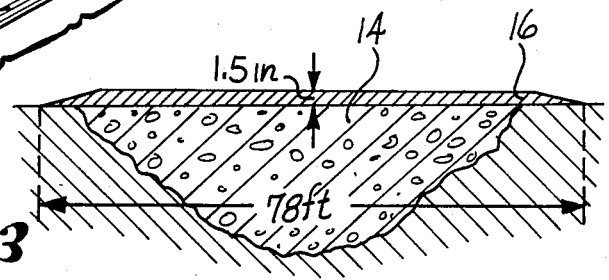
FIG. 3 is a vertical sectional view of the optimal configuration of a mat-repaired crater.
Figure 4:
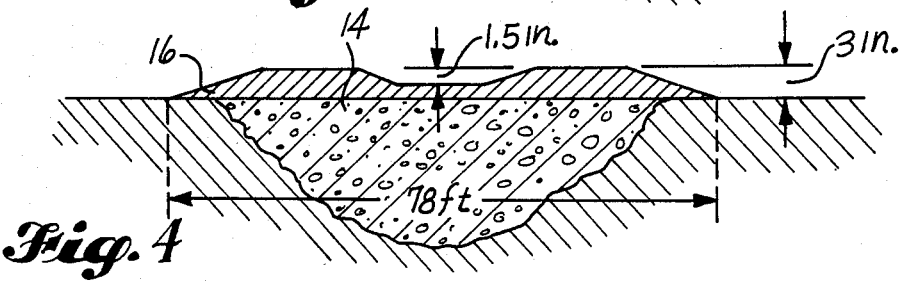
FIG. 4 is like FIG. 3 except that it is a schematic representation of the configuration of a repair site at which there is upheaval of the surrounding pavement and sagging of the mat in the middle of the repair.
Figure 5:
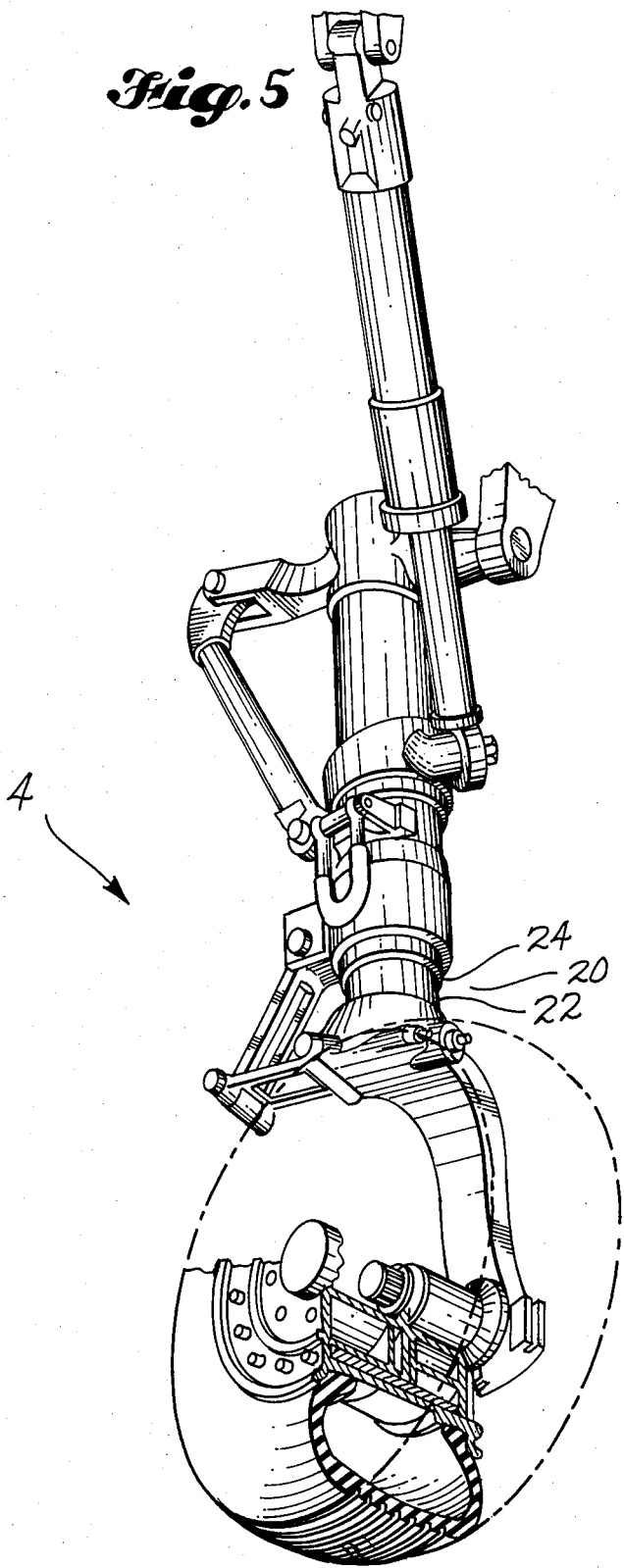
FIG. 5 is a pictorial view of wing landing gear for the type of aircraft shown in FIG. 1 into which the preferred embodiment of the shock absorber of the invention has been incorporated.

The drawings show a shock absorber 20 that is constructed according to the invention and that also constitutes the best mode of the apparatus of the invention currently known to the applicant. The drawings also illustrate the best mode of carrying out the method of the invention currently known to the applicant. FIG. 1 shows a type of military aircraft 2 into which the shock absorber of the invention may be incorporated to advantage. FIG. 5 shows the landing gear 4 of the aircraft 2 with the preferred embodiment of the shock absorber 20 incorporated. FIGS. 2-4 illustrate a situation in which the method and apparatus of the invention may be used to particular advantage. The aircraft 2, landing gear 4, and runway 10 shown in FIGS. 1-5 are shown and described herein for the purpose of illustrating a typical use environment for the method and apparatus of the invention. It is of course to be understood that the method and apparatus of the invention may be used to advantage in the landing gear of other types of aircraft and in other types of rough runway situations, and in various types of shock absorbers not associated with landing gear.

FIG. 2 illustrates what is anticipated will be a typical configuration of a runway 10 that has been damaged by pavement-penetration bombs. The bomb damage includes craters 12 that have not yet been repaired and craters 14 which have been partially repaired. The craters 14 have been filled with debris and other material and are ready to have repair mats 16 placed over them to complete their repair. The runway 10 has been cleared of rubble. FIG. 3 illustrates the optimal configuration of a repair site when 1.5 inch repair mats 16 are used to cover filled craters. FIG. 4 is a schematic representation of the effective configuration of a repair site around which there is upheaval of the pavement and in the middle of which there is sagging of the mat 16. Such upheaval around an unfilled crater 12 is shown at 18 in FIG. 2. The upheaval causes the effective thickness of the mat 16 to be greater than 1.5 inches at its high points, and the sagging causes the effective thickness to decrease toward the center of the mat 16. The characteristics of an expediently repaired runway that place the greatest demands on the landing gear and shock absorbers of an aircraft include the kinds of deviations from optimal repair site configuration illustrated in FIG. 4 and the close spacing of repair mats. The method and apparatus of the invention make it possible for an aircraft to use an expediently repaired runway having such characteristics, as well as a runway with only optimally configured, well-spaced repair sites.

The preferred embodiment 20 of the shock absorber of the invention is best seen in FIGS. 6-15. The shock absorber 20 includes first and second generally tubular members 22, 24, which are positioned telescopically with respect to each other. In the drawings, the first tubular member 22 is shown as the lower member and is received telescopically into the second upper tubular member 24. Each member 22, 24 includes a hollow cylindrical casing with an open end and a closed end. A cylindrical plug 29 is secured in the casing of member 22 adjacent to the closed lower end. A radial flange 56 extends outwardly from the open upper end of member 22 and slidingly and sealingly engages the inner circumferential surface of member 24. A corresponding radial range 58 extends inwardly from the open lower end of member 24 and engages the outer circumferential surface of member 22. Apertures 60 in the casing of member 22 allow free flow of hydraulic fluid into and out from the space between the flanges 56, 58 and the sidewalls of members 22, 24.

A pressure chamber 26 and a reserve chamber 28 are defined between the members 22,24. First, second, and third passageway means communicate the two chambers 26,28. The first passageway means provides a variable metered hydraulic orifice area, the second passageway means provides a fixed metered hydraulic orifice area, and the third passageway means is normally closed by a relief valve 96. The second fixed orifice area is relatively small and is, for example, about eight to ten times smaller than the fully open first orifice area.

Figure 7:
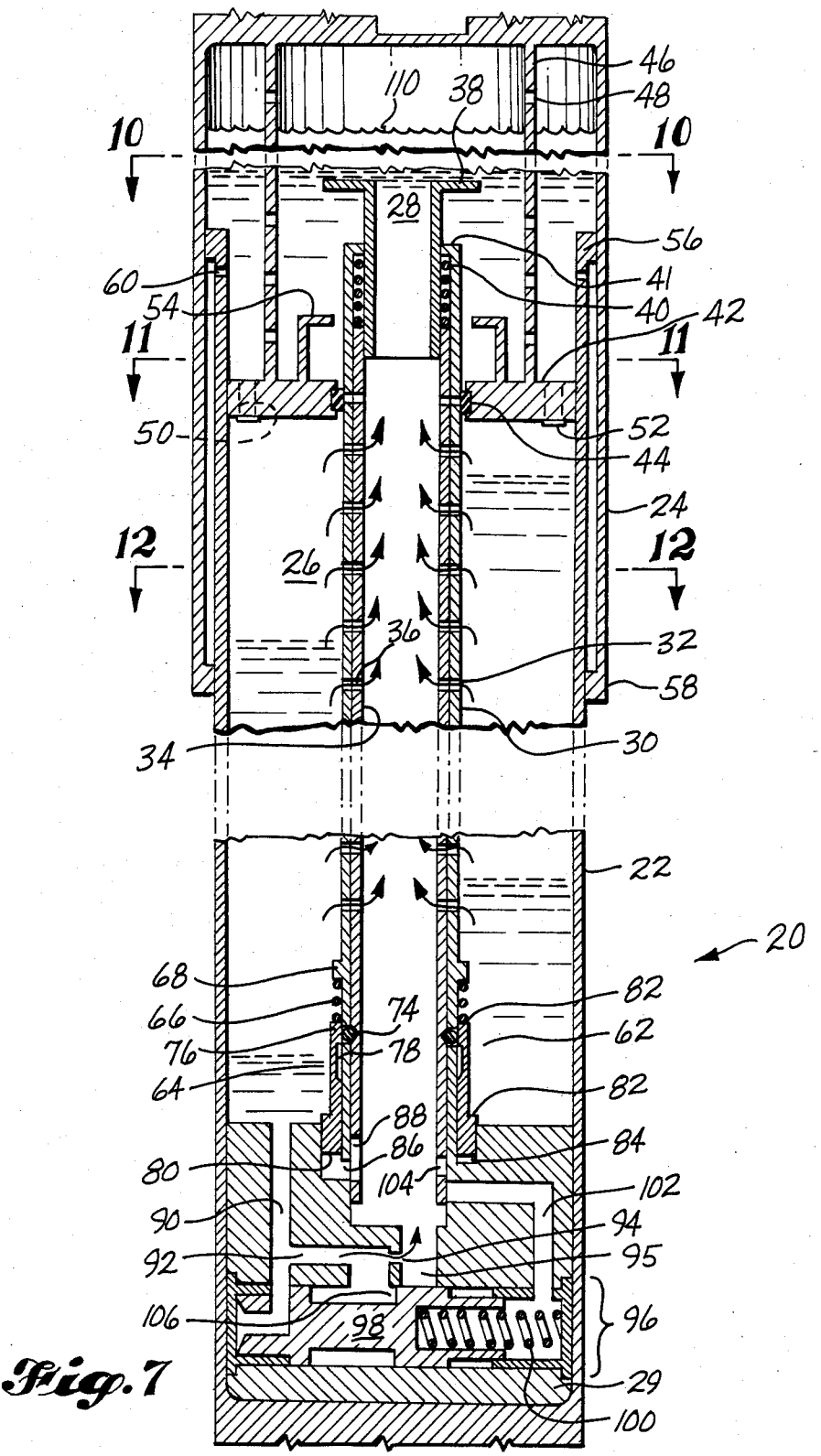
FIG. 7 is like FIG. 6 except that it shows the shock absorber at the beginning of its initial compression.

The lower tubular member 22 carries a metering tube 30 which is an integral axial extension of the plug 29. The first passageway means includes a plurality of axially spaced openings 32 extending radially through the cylindrical sidewall of the metering tube 30. These openings 32 are dimensioned and positioned to provide metered flow from the pressure chamber 26 to the reserve chamber 28 to efficiently absorb energy during an initial retraction of the tubular members 22,24 relative to each other from a fully extended position. The beginning of an initial retraction is shown in FIG. 7.

The upper tubular member 24 carries an annular, radially extending sealing wall or plate 42. This sealing wall 42 is fixed with respect to the tubular member 24 and is carried by an annular support tube 46. The support tube 46 has a number of radial openings 48 extending therethrough in order to provide free flow of fluid between the area inside the tube 46 and the area surrounding the tube 46. The sealing wall 42 carries an annular seal 44 which functions to vary the hydraulic orifice area formed by the first passageway means in a manner described below.

The shock absorber of the invention includes closure means for closing the first orifice area provided by the first passageway means. The closure means has an open position in which it allows flow of hydraulic fluid through the first orifice area, and a closed position in which it blocks such flow. In the preferred embodiment shown in the drawings, the closure means includes a control tube 34 that is coaxial with and axially slidable with respect to the metering tube 30. The control tube 34 has a plurality of axially spaced openings 36 extending radially therethrough.

Figure 6:
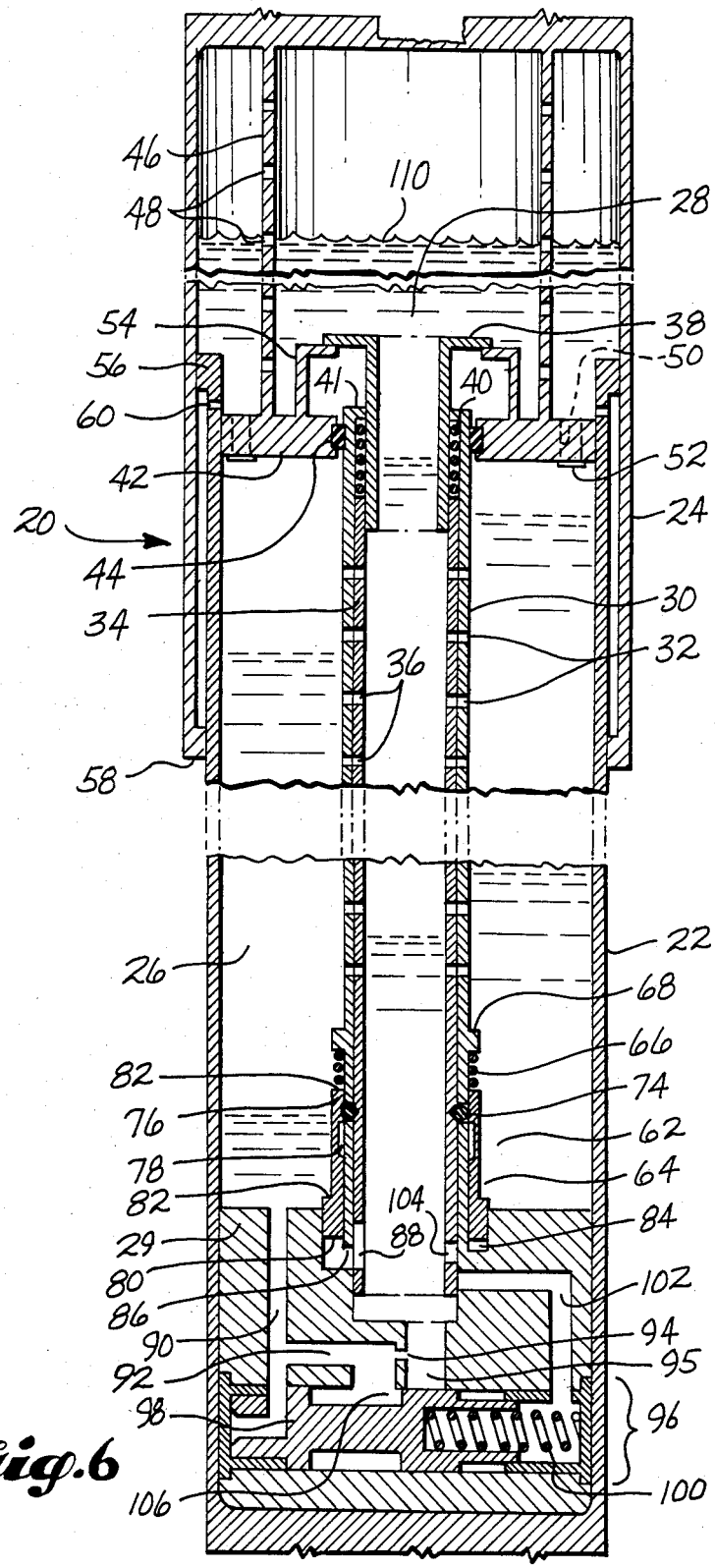
FIG. 6 is a vertical sectional view of the preferred embodiment of the shock absorber, showing the tubular members in their fully extended positions and the latch in its lock position.
Figure 8:
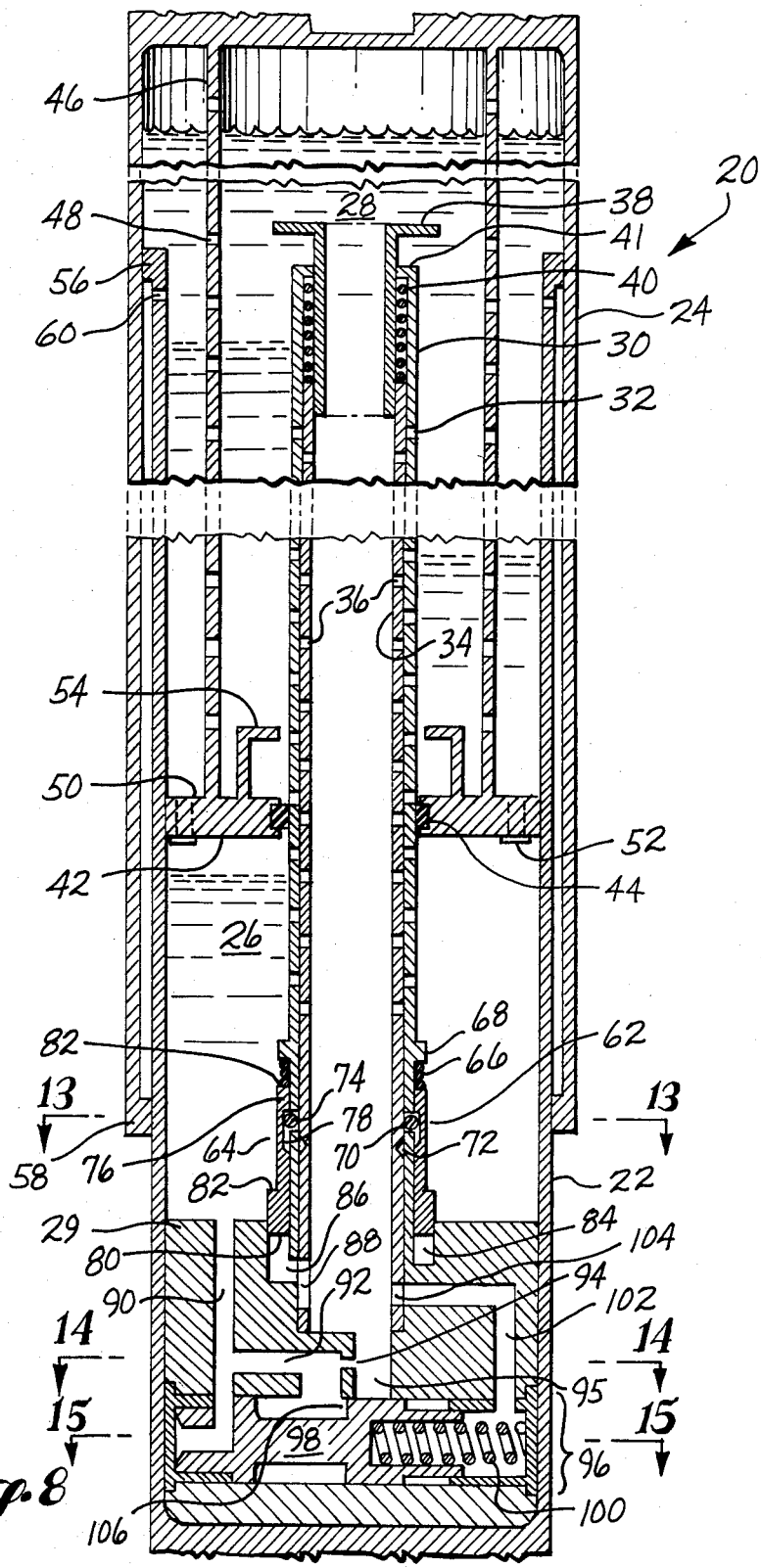
FIG. 8 is like FIGS. 6 and 7 except that it shows the shock absorber in its taxi mode of operation with the latch in its release position.
Figure 9:
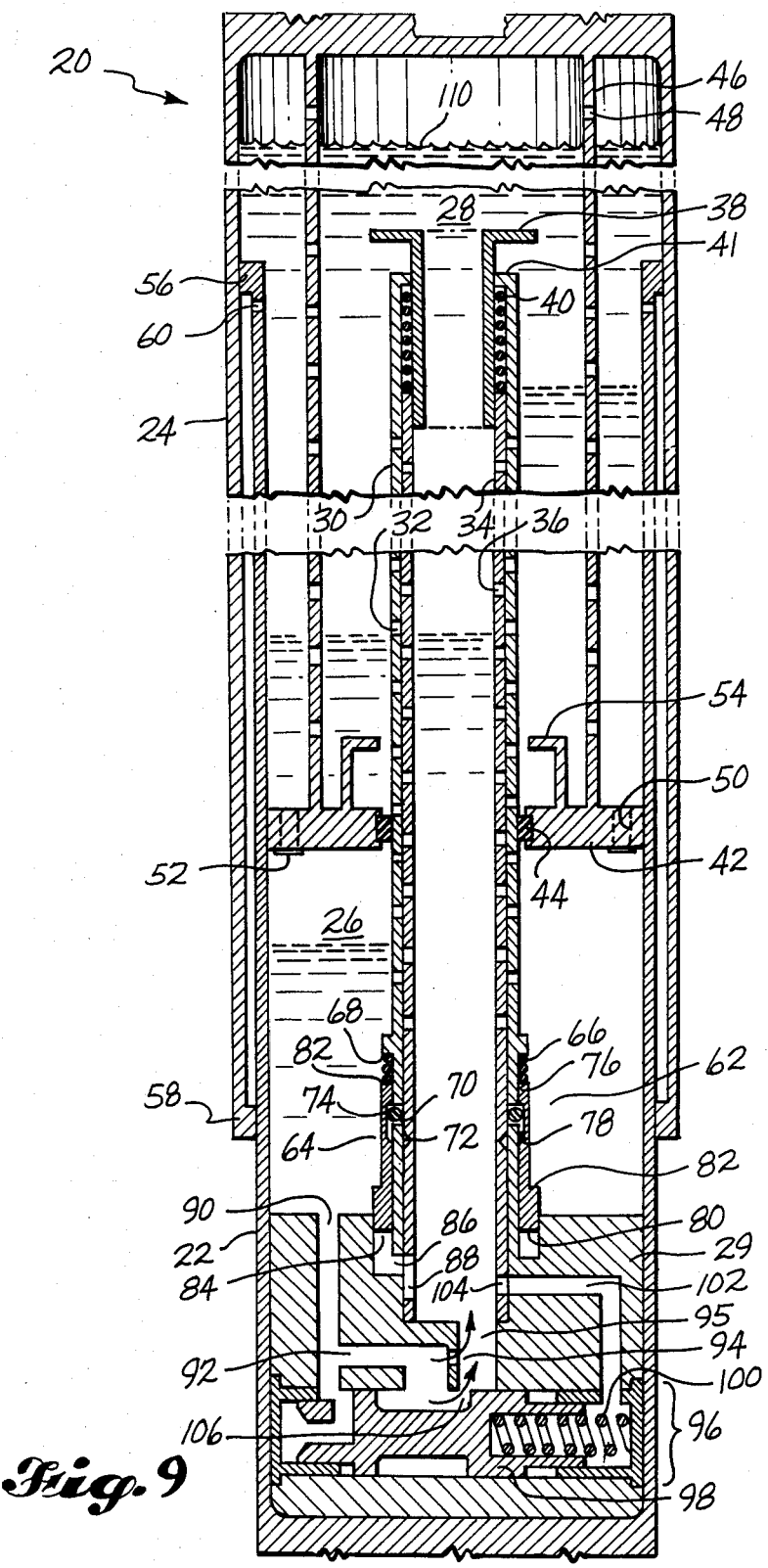
FIG. 9 is like FIG. 8 except that it shows the relief valve in an open position.

These openings 36 are alignable with the openings 32 in the metering tube 30. When the control tube 34 is in an open position, the openings 36 are aligned with the openings 32 to allow flow of hydraulic fluid through openings 32,36. When the control tube 34 shifts from its open position to its closed position, it slides axially with respect to the metering tube 30. This brings the openings 36 in the control tube 34 out of alignment with the openings 32 in the metering tube 30 and wall portions of the control tube 34 into a position in which they block the openings 32 in the metering tube 30. The open position is shown in FIGS. 6 and 7, and the closed position is shown in FIGS. 8 and 9.

The shock absorber of the invention is provided with releasable latch means for locking the closure means in its open position. In the preferred embodiment, the latch means 62 locks the metering tube 30 and the control tube 34 together with the openings 32,36 aligned. As shown in the drawings, the preferred embodiment of the latch means 62 includes an annular slide member 64 that is coaxial with the metering tube 30 and the control tube 34. The slide member 64 is axially slidable with respect to the tubes 30,34 and slides between a lock position in which it locks the tubes 30,34 together with the openings 32,36 aligned and release position in which the control tube 34 is free to slide axially relative to the metering tube 30. When the control tube 34 is freed by the latch 62, it is automatically moved into its closed position by a coil spring 40. The spring 40 is positioned between the upper radial end of the control tube 34 and a radially extending spring abutment 41 formed on the upper end of the metering tube 30. The spring 40 is compressed by upward movement of the control tube 34 into its open position, and energy is thereby stored in the spring 40 for biasing the control tube 34 into its closed position.

In the preferred embodiment shown in the drawings, the metering tube 30 is positioned radially outwardly of and closely adjacent to the control tube 34, and in turn the slide member 64 of the latch 62 is positioned radially outwardly of and closely adjacent to the metering tube 30. The latch 62 locks the tubes 30,34 together by means of a ball and detent arrangement. Adjacent to the slide member 64, the metering tube 30 has a plurality of holes 70 extending radially therethrough. A small metal ball 74 is received into each of these holes 70. The control tube 34 has a radially directed recess 72 formed on its outer circumferential surface corresponding to each one of the radial holes 70 in the metering tube 30. The holes 70 and recesses 72 are positioned with respect to each other so that when they are aligned, the openings 32,36 of the first hydraulic orifice area are aligned. The slide member 64 has a land portion 76 which is adjacent to the balls 74 and the holes 70 in metering tube 30 when the latch 62 is in its lock position. The land portion 76 urges the balls 74 into the recesses 72 in the control tube 34 to lock the metering tube 30 and control tube 34 together. Below the land portion 76, the slide member 64 has a plurality of recesses 78, one corresponding to each ball 74. When the slide member 64 moves axially upwardly to release the latch 62, the radially outer portion of each ball 74 moves into the corresponding recess 78 and the inner portion moves out of the corresponding recess 72 in control tube 34 to allow control tube 34 to move axially with respect to the metering tube 30. To simplify the machining of slide member 64, an annular recess may be provided instead of the plurality of separate recesses 78.

The movement of the slide member 64 and the accompanying release of the latch 62 occurs automatically in response to higher pressure in the reserve chamber 28 than in the pressure chamber 26 caused by extension of tubular members 22,24 relative to each other following an initial retraction of such members 22,24 from a fully extended position. The slide member 64 has a lower radial surface 80 which is in communication with the reserve chamber 28 to receive an upward axially directed force from such higher pressure. As shown in the drawings, the reserve chamber 28 includes the cylindrical space inside the control tube 34. This portion of the reserve chamber 28 communicates with the radial surface 80 on the slide member 64 via a radial passageway 88 through a lower portion of the cylindrical sidewall of the control tube 34, an aligned radial passageway 86 through the metering tube 30, and an annular guide cavity 84 formed in the lower plug 29 of tubular member 22 for receiving the lower end of the slide member 64 and guiding the axial movement thereof.

The slide member 64 also has upwardly facing radial surface portions 82 that are in communication with the pressure chamber 26. These radial surface portions 82 are formed by the upper radial end of the slide member 64 and an intermediate radial step thereon. The portions 82 receive, from pressure in the pressure chamber 26, a downward axially directed force tending to move the slide member 64 toward its lock position and keep it there. The slide member 64 is also provided with a biasing spring 66 positioned between its upper radial end and a radial spring abutment 68 carried by the metering tube 30. The spring 66 biases the slide member 64 toward its lock position. The dimensions of the radial surface portions 82 and the stiffness of the spring 66 are chosen to provide a predetermined amount of resistance to movement of the slide member 64 from its lock position to its release position. Such resistance is sufficient to prevent the slide member 64 from moving to release the control tube 34 until the pressure in the reserve chamber 28 exceeds the pressure in the pressure chamber 26 by a predetermined amount. This insures that the control tube 34 is not released prematurely by minor fluctuations in pressure during the initial compression stroke.

The shock absorber of the invention preferably includes reset means for automatically moving the closure means from its closed position to its open position when the tubular members 22,24 again move into fully extended positions relative to each other and for causing the latch means to automatically lock the closure means in its open position until the latch means is again automatically released in response to higher pressure in the reserve chamber than in the pressure chamber. In the preferred embodiment shown in the drawings, the reset means includes a reset catch 38 carried by the control tube 34. The catch 38 has an L-shaped cross section and includes a vertical portion that is attached to the inner surface of the upper portion of the control tube 34, and a radially extending portion that extends radially outwardly beyond the metering tube 30. The preferred embodiment of the reset means also includes a projection 54 that has an L-shaped cross section and is carried by the sealing wall 42. The projection 54 and the reset catch 38 are positioned with the radial portion of the reset catch 38 overlapping a radially extending portion of the projection 54 to cause the projection 54 to engage the catch 38 as the tubular members 22,24 approach their fully extended positions.

The engagement of projection 54 and catch 38 stops further axial movement of the control tube 34 as the metering tube 30 continues to move axially with the tubular member 22. This in turn causes relative axial movement of the control tube 34 with respect to the metering tube 30 from its closed position to its open position. This relative movement causes the recesses 72 in control tube 34 to be brought into alignment with the radial holes 70 in metering tube 30 to in turn allow the balls 74 to move into such recesses 72. The spring 66 then moves slide member 64 downwardly into its lock position, shown in FIGS. 6 and 7. The upper end of each recess 78 in slide member 64 forms a cam surface to cam ball 74 out of recess 78 and into recess 72 as the slide member 64 moves into its lock position.

As noted above, the pressure chamber 26 and reserve chamber 28 are formed between the telescoping tubular members 22,24, and first, second and third passageway means are provided between the two chambers 26,28. In the preferred embodiment shown in the drawings, the radially extending sealing wall 42 is axially slidable with respect to the metering tube 30 and the control tube 34, and the seal 44 carried by the wall 42 sealingly engages the outer circumferential surface of the metering tube 30. The annular space below the sealing wall 42 forms the pressure chamber 26. The chamber 26 is defined by the lower annular radial surface of the sealing wall 42, outer circumferential surface portions of the metering tube 30, and the upper radial surface of the plug 29 at the lower end tubular member 22, and inner circumferential surface portions of the casing of member 22. The reserve chamber 28 is formed by the generally cylindrical space above the sealing wall 42 and the axially extended cylindrical space inside the control tube 34. The reserve chamber 28 is defined by the inner cylindrical surface of the control tube 34, the upper radial surface of the sealing wall 42, and the upper portion of tubular member 24. As described in detail above, the first passageway means communicates the annular area surrounding the metering tube 30 with the cylindrical area inside the control tube 34 to communicate the pressure chamber 26 with the reserve chamber 28.

The second and third passageway means are provided by passageways through the plug 29 at the bottom of tubular member 22. A vertical passageway 90 extends downwardly into the plug 29 from the pressure chamber 26 to the relief valve 96. Above the valve 96, a horizontal passageway 92 extends radially inwardly from vertical passageway 90 and terminates in a fixed radially directed orifice 94. A vertical passageway 95 communicates orifice 94 with the portion of the reserve chamber 28 inside the control tube 34. The second passageway means extends from the pressure chamber 26 down passageway 90, across passageway 92, through orifice 94, and up passageway 95 into reserve chamber 28. The effective orifice area of fixed orifice 94 is chosen to provide metered flow between the chamber 26,28 to dampen relative axial movement between the tubular members 22,24. The second passageway means and the orifice 94 are always open and offer a constant resistance to flow of hydraulic fluid between the chambers 26,28.

The relief valve 96 includes a valve spool 98 that reciprocates in a valve cavity formed in plug 29. A spring 100 biases the spool 98 into a closed position in which it closes the third passageway means. Vertical passageway 90 communicates pressure chamber 26 with radial surface portions of spool 98 to cause pressure in chamber 26 to exert a force on such radial surface portions tending to move the spool 98 against the force of spring 100 to open the third passageway means. Such movement of the valve spool 98 into an open position is prevented when the control tube 34 is in its open position but is allowed when the control tube is in its closed position. The end of spool 98 opposite passageway 90 is in communication with one end of an L-shaped sensing passageway 102. The other end of sensing passageway 102 is blocked by control tube 34 when tube 34 is in its open position. Since passageway 102 and the guide cavity in which valve spool 98 reciprocates are filled with an incompressible hydraulic fluid, the closing off of one end of passageway 102 prevents movement of the relief valve spool 98. When the control tube 34 drops down into its closed position, a radial opening 104 in tube 34 is brought into alignment with the end of sensing passageway 102 adjacent to control tube 34. This allows movement of hydraulic fluid between passageway 102 and reserve chamber 28 and the pressure in chamber 28 to act on the end of spool 98 in communication with passageway 102. Thus, when there is a rise in pressure in the pressure chamber chamber 26 relative to the pressure in reserve chamber 28 and the pressure in chamber 26 exceeds the pressure in chamber 28 by a predetermined amount, the valve spool 98 moves against the force of spring 100 to open the third passageway means and relieve the pressure in chamber 26.

The third passageway means extends from chamber 26, down vertical passageway 90, across passageway 92, down to the valve spool 98, through an annular relief passageway 106 formed by a reduced diameter portion of spool 98, up into vertical passageway 95, and finally into reserve chamber 28. The dimensioning of the radial surfaces acted on by pressure in the pressure chamber 26 and the reserve chamber 28 and the stiffness of spring 100 are chosen to keep the valve spool 98 in a closed position until the pressure in chamber 26 exceeds the pressure in chamber 28 by said predetermined amount and to allow the spool 98 to move into an open position whenever the difference in pressure equals or exceeds such amount. The open position of spool 98 is shown in FIG. 9.

The operation of the shock absorber of the invention and the carrying out of the method of the invention are illustrated in the drawings. For purposes of clarity, the functioning of the shock absorbing system of the invention will be described herein in relation to the use of the system in the landing gear of an aircraft, such as the military aircraft 2 as shown in FIG. 1.

Referring to FIG. 6, when the aircraft 2 is in flight, the tubular members 22,24 are in their fully extended positions relative to each other and the latch 62 locks the metering tube 30 and control tube 34 together to lock the control tube 34 into its open position. The shock absorber 20 is thus set for operation in its first or landing mode in which both the first and second orifice areas are open. When the aircraft 2 lands, the tubular members 22,24 retract telescopically with respect to each other and the touchdown energy is absorbed by movement of hydraulic fluid from the pressure chamber 26 into the reserve chamber 28 through the first and second metered hydraulic orifice areas. See FIG. 7. During this initial retraction of members 22,24 relative to each other and while the touchdown energy is being absorbed, the relief valve 96 is prevented from opening by the closure of sensing passageway 102 by control tube 34.

Once the touchdown energy has been absorbed, the members 22,24 partially extend relative to each other. This partial extension creates a pressure differential between the chambers 26,28. When the increase in pressure in the reserve chamber 28 relative to the pressure in the pressure chamber 26 is high enough to overcome the force of the spring 66, the pressure in reserve chamber 28 acting on radial surface 80 moves slide member 64 of latch 62 axially upwardly to release the control tube 34. Spring 40, aided by gravity, then moves control tube 34 downwardly into its closed position. This automatically shifts the shock absorber 20 from its first mode of operation to its second, or ground roll, mode of operation illustrated in FIG. 8.

In the second mode of operation, the first orifice area is closed and the second orifice area is open. The control tube 34 is maintained in its closed position by the spring 40. During the second mode of operation, the relative extension and retractions of the tubular members 22,24 with respect to each other are dampened by flow of hydraulic fluid through the relatively small fixed orifice 94 of the second passageway means. Flow through fixed orifice 94 provides the amount of hydraulic damping required to control the pitch and heave motion of the aircraft 2 during ground roll over most of the runway. However, if a particularly rough portion of the runway is encountered, the second passageway means is inadequate to protect the aircraft from loads exceeding its structural limits. The function of the relief valve 96 is to relieve pressure in pressure chamber 26 during the second mode of operation when such pressure becomes dangerously high to in turn protect the aircraft structure from excessive loads. FIG. 9 illustrates the shock absorber 20 in its second mode of operation and the relief valve 96 open to allow flow of hydraulic fluid from the pressure chamber 26 to the reserve chamber 28 through passageway 106 formed by valve spool 98. When the pressure in chamber 26 reduces to a safe level, the valve spool 98 moves back to its closed position.

The control tube 34 remains in its closed position while the aircraft 2 is on the ground and until the aircraft 2 takes off. When the aircraft 2 takes off, the tubular members 22, 24 move, under the influence of gravity and the gas spring described below, into their fully extended positions relative to each other. As described above, as the tubular members 22, 24 approach their fully extended positions, reset catch 38 on control tube 34 engages projection 54 on sealing wall 42 to move control tube 34 into its open position, and slide member 64 of latch 62 is moved by spring 66 to lock control tube 34 and metering tube 30 together. The resets the shock absorber 20 for operation in its first mode when the aircraft 2 again lands.

FIG. 7 illustrates the first mode of operation of the shock absorber 20 at the beginning of the initial retraction of the members 22, 24. The relative upward movement of the lower tubular member 22 moves the metering tube 30 and control tube 34 past the sealing wall 42. This movement past wall 42 causes aligned openings 32, 36 to successively move past seal 44 and into the upper portion of reserve chamber 28. This in turn causes the first hydraulic orifice area to progressively decrease as the tubular members 22, 24 retract to provide increasing resistance to the retracting movement.

In both modes of operation, the extension of tubular members 22, 24 relative to each other is essentially unrestricted. In order to allow such unrestricted extension, the shock absorber 20 includes a plurality of rebound orifices 50 extending through the sealing wall 42 between the pressure chamber 26 and the reserve chamber 28. Each orifice 50 has a valve member 52 of a known type positioned therein. When pressure in the pressure chamber 26 is higher than pressure in the reserve chamber 28, such pressure in chamber 26 keeps the valves 52 in a closed position to close rebound orifices 50. Valve members 52 move into an open position to open rebound orifices 50 when pressure in the reserve chamber 28 exceeds pressure in the pressure chamber 26. This allows the tubular members 22, 24 to freely extend when a dip or hole is encountered during ground roll or the aircraft 2 bounces after initial touchdown and, in addition, when the aircraft 2 takes off.

The chambers 26, 28 and the passageways and cavities in the plug 29 are filled with an essentially incompressible hydraulic fluid up to a fill line 110 in the upper portion of reserve chamber 28. The space above fill line 110 is filled with a compressible gas, preferably an inert gas such as nitrogen. When the tubular members 22, 24 retract with respect to each other, the fill line 110 is moved upwardly and the gas is compressed. The energy stored in the compressed gas helps to ensure the free extension of the tubular members 22, 24 and also provides a spring force for ensuring the proper resetting of the shock absorber 20 when the aircraft 2 takes off.

Throughout the description of the preferred embodiment of the method and apparatus of the invention, the terms "upper", "lower", "upwardly", "downwardly", and the like have been used. These terms have been used for illustrative purposes only, illustrating a typical use attitude of the shock absorber. The terms are not intended to indicate that the use attitude of the shock absorber is limited to the vertical position shown in the drawings, and it is intended to be understood that the shock absorber of the invention can be used to advantage in other use attitudes.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. A dual mode shock absorber, comprising:
   first and second generally tubular members positioned telescopically with respect to each other, said members defining a pressure chamber and a reserve chamber therebetween;
   first and second passageway means for providing first and second metered hydraulic orifice areas, respectively, between said chambers;
   closure means for closing said first orifice area; said closure means having an open position in which it allows flow of hydraulic fluid through said first orifice area, and a closed position in which it blocks such flow; and
   releasable latch means for locking the closure means in its open position; said latch means being automatically releasable, to allow the closure means to move into its closed position, in response to higher pressure in the reserve chamber than in the pressure chamber caused by extension of said members relative to each other;
   said shock absorber having a first mode of operation in which both such orifice areas are open during an initial retraction of said members relative to each other, and a second mode of operation in which the first orifice area is closed by the closure means and the second orifice area is open.

2. A shock absorber as described in claim 1, further comprising reset means for automatically moving the closure means from its closed position to its open position when said tubular members move into fully extended positions relative to each other and for causing the releasable latch means to automatically lock the closure means in such open position until the latch means is automatically released in response to higher pressure in the reserve chamber than in the pressure chamber.

3. A shock absorber as described in claim 2, further comprising third passageway means between the pressure chamber and the reserve chamber, and a relief valve that normally closes the third passageway means but, when the shock absorber is in its second mode of operation, opens in response to a compressive load on such tubular members exceeding a predetermined amount to permit flow of hydraulic fluid through the third passageway means from the pressure chamber into the reserve chamber.

4. A shock absorber as described in claim 1, in which the first passageway means comprises a plurality of axially spaced openings in a metering tube carried by one of the tubular members;
   the closure means comprises a control tube that is coaxial with and axially slidable with respect to the metering tube and that has a plurality of axially spaced openings;
   the latch means includes portions that lock the metering tube and the control tube together with the openings in the control tube aligned with the openings in the metering tube when the closure means is in its open position; and
   the closure means further comprises biasing means for biasing the control tube toward a position in which the openings in the control tube are out of alignment with the openings in the metering tube and portions of the control tube block the openings in the metering tube.

5. A shock absorber as described in claim 3, further comprising reset means for automatically moving the closure means from its closed position to its open position and the openings in the control tube into alignment with the openings in the metering tube when said tubular members move into fully extended positions relative to each other, and for causing the releasable latch means to automatically lock the closure means in such open position and the control tube and the metering tube together until the latch means is automatically released in response to higher pressure in the reserve chamber than in the pressure chamber.

6. A shock absorber as described in claim 4, which further comprises an annular seal plate carried by one of said tubular members and axially slidable with respect to the metering tube and the control tube, said seal plate sealingly engaging the outer circumferential surface of the outermost of said metering tube and control tube; and
   in which the pressure chamber is defined by an annular radial surface of the seal plate, a portion of the outer surface of the outermost of the metering tube and the control tube, and portions of the tubular member which carries the metering tube; and the reserve chamber is defined by an inner generally cylindrical surface of the innermost of the metering tube and control tube, an annular radial surface of the seal plate opposite the radial surface which partially defines the pressure chamber, and portions of the tubular member which carries the seal plate.

7. A shock absorber as described in claim 4, which further comprises:
   an annular seal plate carried by one of said tubular members and axially slidable with respect to the metering tube and the control tube, said seal plate sealingly engaging the outer circumferential surface of the outermost of said metering tube and control tube; and
   reset means for moving the closure means from its closed position to its open position when said tubular members move into fully extended positions relative to each other and for causing the latch means to lock the closure means in its open position until the latch means is automatically released in response to higher pressure in the reserve chamber than in the pressure chamber; said reset means including biasing means for moving the latch means into a lock position in which it locks the closure means in its open position when the closure means moves into such open position, a projection carried by the seal plate, and a reset catch carried by the control tube, said projection and reset catch being positioned to cause the projection to engage the catch as the tubular members approach such fully extended positions.

8. A shock absorber as described in claim 4, further comprising third passageway means between the pressure chamber and the reserve chamber; a relief valve that normally closes the third passageway means but, when the shock absorber is in its second mode of operation, opens in response to a compressive load on such tubular members exceeding a predetermined amount to permit flow of hydraulic fluid through the third passageway means from the pressure chamber into the reserve chamber; and sensing passageway means communicating the reserve chamber and one end of the relief valve, which sensing passageway means is blocked by the control tube when the closure means is in its open position and is open when the closure means is in its closed position.

9. A shock absorber as described in claim 1, in which the first passageway means comprises a plurality of axially spaced openings in a metering tube carried by one of the tubular members;
the closure means comprises a control tube that is coaxial with and axially slidable with respect to the metering tube, said control tube having a plurality of axially spaced openings that are aligned with the openings in the metering tube when the closure means is in its open position;
the latch means includes an annular slide member that is coaxial with the metering tube and the control tube and that is axially slidable between a lock position in which it locks the metering tube and the control tube together with the openings in the control tube aligned with the openings in the metering tube, and a release position in which the control tube is free to slide axially relative to the metering tube; said slide member having a radial surface which is in communication with the reserve chamber and receives an axially directed force from said higher pressure to move the slide member from its lock position to its release position; and
the closure means further comprises biasing means for biasing the control tube toward a position in which the openings in the control tube are out of alignment with the openings in the metering tube and portions of the control tube block the openings in the metering tube.

10. A shock absorber as described in claim 9, further comprising reset means for automatically moving the closure means from its closed position to its open position and the openings in the control tube into alignment with the openings in the metering tube when said tubular members move into fully extended positions relative to each other, and for causing the releasable latch means to automatically lock the closure means in such open position and the control tube and the metering tube together until the latch means is automatically released in response to higher pressure in the reserve chamber than in the pressure chamber.

11. A shock absorber as described in claim 9, in which the slide member further includes radial surface portions that are in communication with pressure in the pressure chamber and that receive therefrom an axially directed force tending to move the slide member toward its lock position, and the latch means further includes resilient means for biasing the slide member toward its lock position; said radial surface portions being dimensioned and said resilient means being sufficiently stiff to prevent the slide member from moving into its release position until the pressure in the reserve chamber exceeds the pressure in the pressure chamber by a predetermined amount.

12. A shock absorber as described in claim 9, in which the latch means includes a plurality of radially directed recesses in the control tube and a plurality of balls positioned in radial holes through the metering tube, and the slide member urges said balls into said recesses to lock the metering tube and control tube together when the slide member is in its lock position.

13. A dual mode method for absorbing shocks, comprising:
providing two tubular members positioned telescopically with respect to each other and defining a pressure chamber and a reserve chamber therebetween providing first and second metered hydraulic orifice areas between such chambers, and providing closure means for closing said first orifice area;
fully extending the tubular members with respect to each other, and releasably locking the closure means into an open position in which it allows flow of hydraulic fluid through said first orifice area;
applying a compressive force to said members to cause them to retract relative to each other, and allowing hydraulic fluid to flow throgh both the first and the second orifice areas to absorb the energy of the compressive force;
when such energy has been absorbed, allowing such members to partially extend relative to each other and allowing a pressure differential between said chambers caused by the relative extension of said members to release the closure means and in turn allow the closure means to move into a closed position in which it blocks the first orifice area; and
while maintaining the closure means in such closed position, allowing relative extensions and retractions of said members with respect to each other to be dampened by flow of hydraulic fluid through the second orifice area.

14. A method as described in claim 13, further comprising allowing a subsequent full extension of said members relative to each other to automatically move the closure means back into said open position, and again releasably locking the closure means in said open position.

15. A method as described in claim 13, in which providing said first orifice area comprises a providing a plurality of axially spaced openings in a metering tube carried by one of said members; providing said closure means comprises providing a control tube which is coaxial with the axially slidable with respect to the metering tube, which has a plurality of axially spaced openings that are aligned with the openings in the metering tube when the closure means is in said open position, and portions of which block the openings in the metering tube when the closure means is in said closed position; and releasably locking the closure means into said open position comprises releasably locking the metering tube and the control tube together.

16. A method as described in claim 15, further comprising allowing a subsequent full extension of said members relative to each other to automatically move the closure means back into said open position, and again releasably locking the closure means in said open position.

17. A method as described in claim 13, further comprising providing a relief valve between said chambers, maintaining such valve in a closed position when the closure means is in said open position, and allowing such valve to open to communicate said chambers with each other when the closure means is in its closed position and a compressive load on said members exceeds a predetermined limit.

* * * * *

UNITED STATES PATENT AND TRADEMARK OFFICE
CERTIFICATE OF CORRECTION

PATENT NO. : 4,623,049

DATED : November 18, 1986

INVENTOR(S) : Steven M. Warren

It is certified that error appears in the above—identified patent and that said Letters Patent are hereby corrected as shown below:

```
Column 5, line 51,  "sock"    should be  -- shock --.
Column 8, line 61,  "range"   should be  -- flange --.
Column 12, line 30, "chamber" should be  -- chambers --.
Column 12, line 47, -- 34 -- should be inserted following
     "control tube.".
Column 12, 4th line from the bottom, -- chamber --, second
     occurrence, should be deleted.
Column 13, line 61, "extension" should be  -- extensions
     --.
Column 14, line 26, "The"   should be  -- This --.
Claim 5, column 16, line 20, "3" should be  -- 4 --.
Claim 13, column 18, line 31, "throgh" should be  --
     through --.
Claim 15, column 18, line 53, -- a --, first occurrence,
     should be deleted.
Claim 15, column 18, line 57, "the", first occurrence,
     should be  -- and --.
```

Signed and Sealed this

Seventeenth Day of March, 1987

*Attest:*

DONALD J. QUIGG

*Attesting Officer*   Commissioner of Patents and Trademarks